J. D. PIERCE.

Assignor, by mesne assignments, to SHIELDS & BROWN.

COVERING FOR STEAM PIPES, &c.

No. 10,375. Reissued Aug. 28, 1883.

Witnesses.
Will R. Cruchundra.
Willie Rossiter.

Inventor.
James D. Pierce
By, Jno. G. Elliott
Atty.

UNITED STATES PATENT OFFICE.

JAMES D. PIERCE, OF MILWAUKEE, WISCONSIN, ASSIGNOR, BY MESNE ASSIGNMENTS, TO SHIELDS & BROWN, OF CHICAGO, ILLINOIS.

COVERING FOR STEAM-PIPES, &c.

SPECIFICATION forming part of Reissued Letters Patent No. 10,375, dated August 28, 1883.

Original No. 252,400, dated January 17, 1882. Application for reissue filed July 17, 1883.

*To all whom it may concern:*

Be it known that I, JAMES D. PIERCE, a citizen of the United States, residing in Milwaukee, county of Milwaukee, and State of Wisconsin, have invented certain new and useful Improvements in Coverings for Steam Pipes and Boilers, of which the following is a specification.

This invention relates to improvements in coverings for pipes, boilers, &c., composed of layers of paper or other material analogous for the same purpose.

Prior to my invention coverings for pipes have been composed of a non-conducting material, wholly or partly of paper, or, what is more commonly known to the trade as "felt," in sheets having a plain and substantially smooth surface, which sheets, as they are drawn and wound tightly around a mandrel to form a pipe-covering, have spread over their entire inner surface a cement or other adhesive or filling material, which adhesive or filling materials have also been employed in other than pipe-coverings, composed of two or more layers of felt compressed together, and thereby rendering the covering so dense that its non-conducting properties are very greatly lessened.

The object of this invention is to avoid these objections and give such a covering a maximum power to resist the passage of heat through it by utilizing, in connection with the covering, confined air, a well-known and efficient non-conductor of heat, by providing the covering with cellular or dead-air spaces between two or more of its layers; and to this end my invention consists in indenting or corrugating the inner surface of one or more of the sheets forming a layer of the covering, as hereinafter more fully described, and shown in the accompanying drawings, in which—

Figure 1:
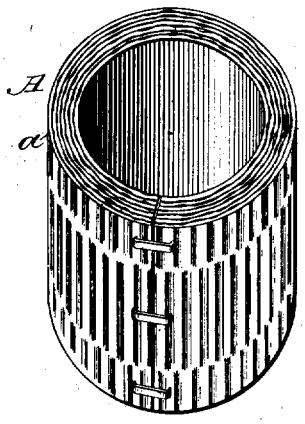
Figure 2:
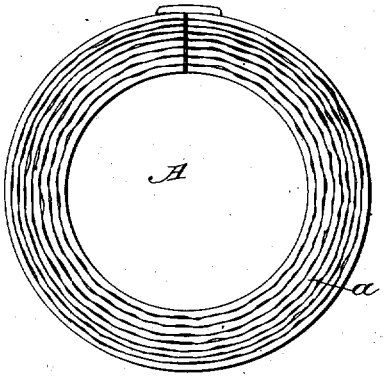
Figure 3:
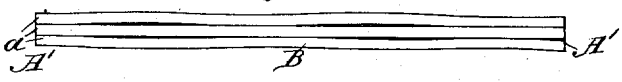
Figure 4:
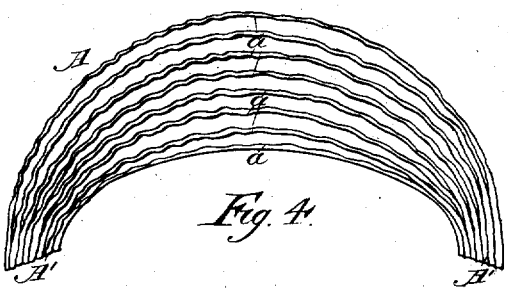

Figure 1 is a perspective view of a section of pipe-covering embodying my invention; Fig. 2, an end elevation of the same; Fig. 3, a similar view of a section of a covering for flat surfaces. Fig. 4 is an end elevation of a section of pipe-covering having the edges of the layers secured together and the opposing edges of the covering spread apart.

Similar letters of reference indicate the same parts in the several figures of the drawings.

In carrying out my invention two or more layers of paper, *a*, are employed, which layers may be varied in number according to the thickness of covering desired. These layers may be indented, as shown in pipe-coverings A, illustrated in Figs. 1, 2, and 4, or corrugated, as shown in a covering, B, for flat surfaces, illustrated in Fig. 3, for by either of these means the object of my invention is attained—namely, that of providing dead-air spaces between two or more of the layers of the covering, and, so far as the attainment of this object to a degree is concerned, but one layer need be corrugated or indented, though of course it is essential that such corrugations or indentations should be on the face of a layer next an adjacent layer.

In manufacturing pipe-coverings the paper is wrapped about a mandrel, and each layer is secured at intervals to that immediately below it, as shown at A′; Figs. 3 and 4, by cementing or otherwise joining them at such intervals. The structure may now be cut open through the center of the cemented line by means of a knife or saw, and the structure slipped off the mandrel; and as the edges of the layers of which the structure is composed are securely fastened together, it may be packed and transported without injury.

If my covering is designed for a flat surface, I merely secure flat layers of paper to each other in lines A′, as shown in Fig. 3, and through these lines make the cuts which divide the covering into blocks or sheets.

As the layers which compose my improved covering are secured together in lines, through which the dividing cuts are to be made, there will be left between the layers at other points—those between the secured portions—a great deal of space for non-circulating or dead air, and this gives to my covering a maximum power to resist the passage of heat through it.

The particular means of, and the advantages derived from, uniting the layers of the covering at intervals, as herein described, being also adapted to coverings the layers of which are plain, forms the subject-matter of, and is set forth in, the specification and claims of another division of this reissue.

Having described my invention, what I claim, and desire to secure by Letters Patent, is—

1. As an article of manufacture, a covering for heated surfaces, composed of non-conducting sheets or layers having direct contact with each other at points, and dead-air spaces between two or more of said sheets or layers, substantially as described.

2. As a new article of manufacture, a covering for heated surfaces, composed of two or more layers of non-conducting material, one or more of said layers being provided with corrugations or indentations in its surface adjacent the next layer, substantially as and for the purpose described.

JAMES D. PIERCE.

Witnesses:
GEO. P. MILLER,
BENJ. K. MILLER, Jr.